No. 881,233. PATENTED MAR. 10, 1908.
C. FOX.
DEVICE FOR DISTRIBUTING OR TAKING UP BARB WIRE.
APPLICATION FILED OCT. 11, 1907.
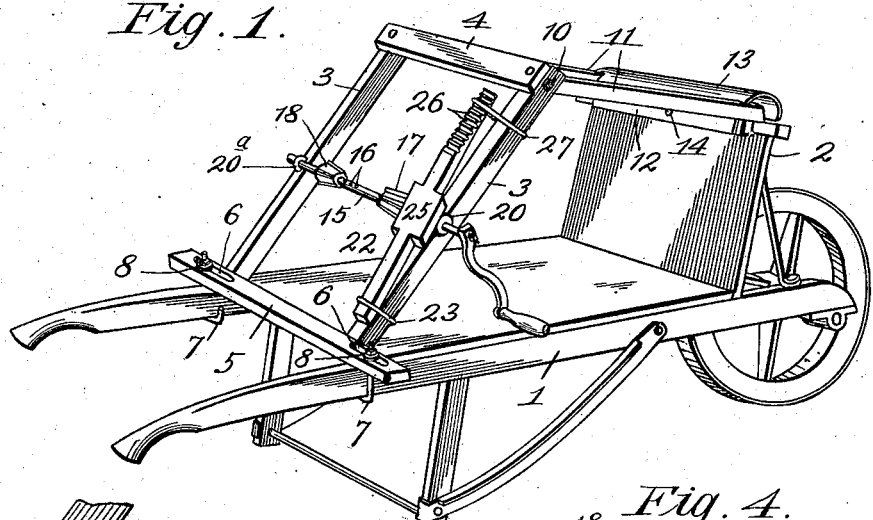
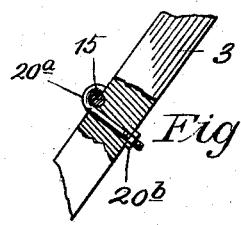
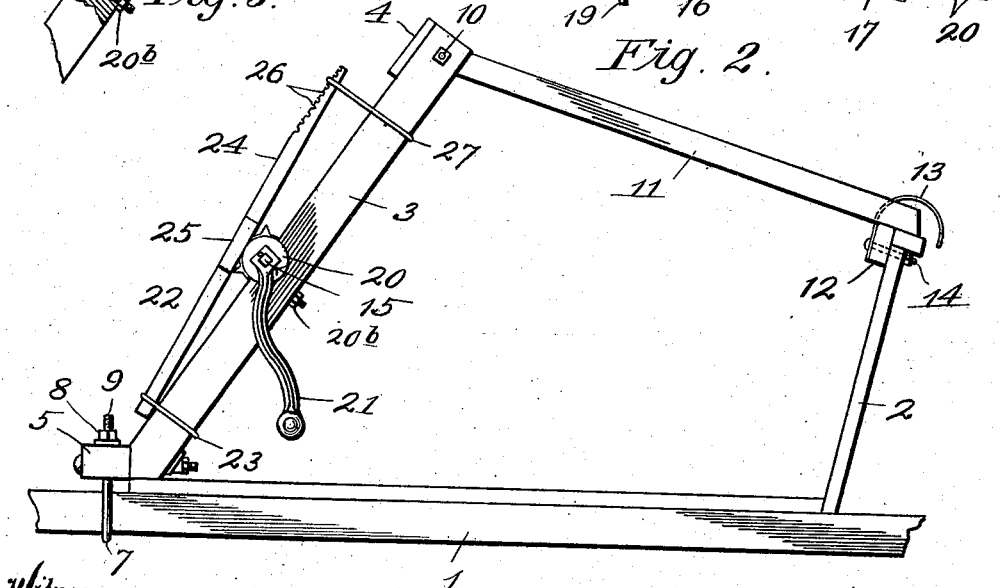
Witnesses:
R. E. Hamilton
M. Cox
Inventor,
Charles Fox
By F. G. Fischer, atty.

UNITED STATES PATENT OFFICE.

CHARLES FOX, OF LEAVENWORTH, KANSAS.

DEVICE FOR DISTRIBUTING OR TAKING UP BARB-WIRE.

No. 881,233.            Specification of Letters Patent.        Patented March 10, 1908.

Application filed October 11, 1907. Serial No. 396,882.

*To all whom it may concern:*

Be it known that I, CHARLES FOX, a citizen of the United States, residing at Leavenworth, in the county of Leavenworth and State of Kansas, have invented certain new and useful Improvements in Devices for Distributing or Taking Up Barb-Wire, of which the following is a specification.

My invention relates to improvements in devices for distributing or taking up barb-wire; and my object is to provide a simple device of this character wherewith one operator may readily distribute or take up barb or other wire of any length.

In order that the invention may be fully understood, reference will now be made to the accompanying drawing in which:

Figure 1 represents the device mounted upon a wheel-barrow ready for use. Fig. 2 is an enlarged side elevation of the same, the wheel-barrow being partly broken away. Fig. 3 is a broken detail of the frame, shaft and one of the bearings employed in carrying out the invention. Fig. 4 is a broken elevation partly in section of the shaft and bearings, employed in carrying out the invention.

In practice I prefer to mount the device upon a vehicle of some kind, so that it may be conveniently transported while distributing or taking up wire. In the accompanying drawing I have shown the vehicle in the form of a wheel-barrow provided with sills 1 and a dashboard 2.

In constructing my device I employ a pair of arms 3 united at their ends by cross-pieces 4 and 5, which latter has longitudinal slots 6 through which a pair of hooks 7 extend for the purpose of adjustably engaging the sills of the wheel-barrow, with which they are drawn into frictional engagement with nuts 8 engaging their threaded upper ends 9. Said hooks are adjustable in slots 6 so that they may accommodate wheel-barrows of different widths.

Arms 3 are pivotally secured by means of bolts 10 to another pair of arms 11 united near their forward ends by a cross-piece 12 provided with an apron 13. The forward ends of arms 11 rest upon the dashboard 2, the inner side of which is engaged by the cross-piece 12, which is provided with a bolt 14 so that it may be firmly but removably secured to the dashboard. By pivotally uniting arms 3 and 11, the frame formed thereby may be folded up when the device is not in use, or may be extended or contracted to fit wheel-barrows of different lengths.

15 designates a transverse shaft removably mounted on arms 3 and provided with a series of holes 16.

17 18 designate a pair of ribbed, tapering bearings, the latter of which is removably and adjustably mounted upon the shaft, it being adjustably held in position thereon by a pin 19 adapted to engage any one of the holes 16 in the shaft. In this manner bearing 18 may be adjusted closer to or farther from bearing 17 to accommodate barb-wire spools of different lengths.

20 designates a pair of collars fixed to the shaft and arranged at opposite sides of one of the arms 3, to prevent the shaft from shifting longitudinally in its bearings consisting, preferably, of hooks $20^a$ removably secured to arms 3 by nuts $20^b$.

21 designates a crank removably secured to one end of the shaft for the purpose of rotating the same.

22 designates a brake removably secured to one of the arms 3 by a link 23. Said brake consists of a lever 24, having an enlarged side portion 25 forming a shoe adapted to engage the collars 20, and thus retard the rotation of shaft 15. The upper end of lever 24 is tapered and provided with notches 26 any one of which may be engaged by a loop 27 loosely engaging the adjacent arm 3, said loop being provided for the purpose of holding the brake in contact with the collars 20 so that the operator may have both hands free to move the wheel-barrow. The friction with which the brake engages the collars may be regulated as desired by adjusting loop 27 up or down on the lever.

When it is desired to distribute wire, a spool containing the same is placed in position upon bearings 17 18, the ribbed peripheries of which become embedded in the spool and turn therewith. The free end of the wire is then drawn forward over apron 13 and attached to a post or other stationary object located at the starting point. The brake is then adjusted upon the collars 20 with sufficient pressure to keep the wire taut when it unwinds from the spool. The operator next draws the wheel-barrow backwardly until the desired length of wire has been paid out, the upper surface of the dashboard 2 and cross-piece 12 being protected during this operation by the curved apron 13 which presents a smooth surface for the wire to travel over.

When it is desired to take up wire, an empty spool is placed upon bearings 17 18, then the wire, which has been previously straightened out, is attached at one end to a stationary object and at its opposite end to the spool. Crank 21 is now rotated with one hand to wind the wire upon the spool and draw the wheel-barrow forward, which latter is shifted from side to side with the other hand so that the wire will be wound uniformly upon the spool from one end of the latter to the other. During this operation loop 27 is disengaged from the brake, as the weight of the wheel-barrow being dragged forward by the wire will insure the latter being wound sufficiently tight upon the spool.

Having thus described my invention, what I claim is:—

1. In a device of the character described, a folding frame adapted to be extended or contracted to fit vehicles of different lengths, and means journaled on said frame for carrying a spool.

2. In a device of the character described, a frame adapted to be extended or contracted to fit vehicles of different lengths, adjustable fastening devices carried by the frame for securing it to vehicles of different widths, and means journaled on said frame for carrying a spool.

3. In a device of the character described, the combination with a vehicle, of a folding frame removably mounted thereon, a shaft removably journaled on said frame and adapted to carry a spool, and means for retarding the rotation of said shaft.

4. In a device of the character described, the combination with a vehicle, of a folding frame removably mounted thereon, a shaft removably journaled on said frame and adapted to carry a spool, and tapered bearings mounted upon the shaft, one of said bearings being adjustably and removably mounted upon the shaft.

5. In a device of the character described, the combination with a vehicle, of a folding frame removably mounted thereon, a shaft removably journaled on said frame and adapted to carry a spool, and a crank on the shaft whereby the same may be rotated.

6. In a device of the character described, the combination with a vehicle, of a folding frame removably mounted thereon, a shaft journaled on said frame and adapted to carry a spool, collars on said shaft to hold it from longitudinal movement, and a brake carried by the frame adapted to engage the collars.

7. In a device of the character described, the combination with a vehicle, of a frame removably mounted thereon, a shaft journaled on said frame and adapted to carry a spool, collars on said shaft to hold it from longitudinal movement, a brake carried by the frame adapted to engage the collars, said brake having notches at one end, and a loop adjustable on the frame and adapted to engage any of said notches.

8. In a device of the character described, the combination with a wheel-barrow, of a folding frame adjustably and removably secured to the sills and removably secured to the dashboard of the wheel-barrow, means on said frame for carrying a spool of wire, and means on one end of the frame for the wire to travel over.

9. In a device of the character described, the combination with a wheel-barrow, of a folding frame adjustably and removably secured to the sills and removably secured to the dashboard of the wheel-barrow, means on said frame for carrying a spool of wire, and an apron on the front end of the frame overhanging the top of the dashboard.

In testimony whereof I affix my signature, in the presence of two witnesses.

CHARLES FOX.

Witnesses:
F. G. FISCHER,
M. COX.